UNITED STATES PATENT OFFICE.

DAVID BRAININ, OF CHARLOTTENBURG, GERMANY.

ARTICLE OF FOOD AND PROCESS OF PRODUCING THE SAME.

1,088,875.  Specification of Letters Patent.  Patented Mar. 3, 1914.

No Drawing.  Application filed December 11, 1912.  Serial No. 736,063.

*To all whom it may concern:*

Be it known that I, DAVID BRAININ, chemist, a subject of the Emperor of Russia, residing at 61 Leibnizstrasse, in the city of Charlottenburg, in the Kingdom of Prussia, German Empire, have invented a certain new and Improved Article of Food and Process of Producing the Same, of which the following is a specification.

The present invention relates to a process of producing an article of food, from vegetable matter, adapted to serve as a substitute for meat and having a nutritive value equivalent to that of meat.

For the purposes of the invention I use roasted soy beans, with or without addition of other vegetable matter, for example unripe rye and steamed oats deprived of their husks. The soy bean is very rich in nutriment and its presence in the food greatly increases the nutritive value of the same.

The process of manufacture may be carried out as follows: I dry and rough-grind unripe rye, and use oats in two forms, namely rough ground oats and raw oats steamed or deprived of their husks and dried. The soy beans are prepared by subjecting them in the first instance to a roasting process in order to reduce the odorous constituents, especially the large amount of oil contained in the beans, and for the purpose of opening them and rendering them easily digestible, the roasting process being, however, only carried to the light brown stage, in order to retain the nutritive constituents of the bean unchanged. The light roasting is of great importance in view of the nature of soy beans, since as soon as the dark brown stage is reached, corresponding to the stage to which coffee beans are usually roasted, all the nourishing matter is converted and lost. The lightly roasted beans are ground or pounded and mixed with the other substances.

The unripe oats are used in view of their high nourishing value and percentage of juicy ingredients and in order to reduce the proportion of meal present. Treating the raw oats with steam renders them readily soluble and easily digestible.

Vegetables may be added to the food produced in this manner, and flavor may be imparted by the addition of aromatic herbs. In order to further increase the nutritive value of the food, fruits, for instance bananas, previously subjected to a suitable drying process, may also be added. Animal matter may also be added to the food.

The food may be manufactured in powdered or granular form, or in the form of tablets.

What I claim as my invention is:

1. A process of producing an article of food, comprising lightly roasted soy beans; and then mixing the lightly roasted soy beans with other vegetable substance.

2. An article of food comprising lightly-roasted soy beans mixed with other vegetable substance.

3. An article of food consisting of unripe, dried and rough-ground rye in combination with steamed oats deprived of their husks and lightly roasted and ground soy beans, the mixture being in the form of powder, granules or tablets.

4. An article of food comprising lightly-roasted soy beans mixed with rye and oats.

5. An article of food comprising lightly-roasted soy beans mixed with rye and steamed oats.

In testimony whereof I have affixed my signature in presence of two witnesses.

DAVID BRAININ.

Witnesses:
HERMAN PLISCHKE,
MARIA MENKE.